(12) United States Patent
Takizawa

(10) Patent No.: US 6,808,232 B2
(45) Date of Patent: Oct. 26, 2004

(54) CHILD SEAT

(75) Inventor: Manabu Takizawa, Saitama (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 10/254,977

(22) Filed: Sep. 26, 2002

(65) Prior Publication Data
US 2003/0057753 A1 Mar. 27, 2003

(30) Foreign Application Priority Data

Sep. 27, 2001 (JP) ........................................ 2001-297928

(51) Int. Cl.[7] ................................................ A47D 1/10
(52) U.S. Cl. .................. 297/256.13; 297/256.1
(58) Field of Search ...................... 297/250.1, 256.13, 297/256.1, 484, 483, 327, 320, 318, 317, 316, 340, 341, 342

(56) References Cited

U.S. PATENT DOCUMENTS 3,404,917 A  * 10/1968 Smith
4,915,446 A  * 4/1990 Darling et al.
6,568,755 B1 * 5/2003 Groening

FOREIGN PATENT DOCUMENTS

| EP | 0 301 281 A2 | 2/1989 |
| EP | 0 545 185 A1 | 6/1993 |
| EP | 0 554 807 A2 | 8/1993 |

* cited by examiner

Primary Examiner—Milton Nelson, Jr.
(74) Attorney, Agent, or Firm—Young & Thompson

(57) ABSTRACT

A child seat comprises a main body, a seat portion which is supported by the main body so as to be movable in a longitudinal direction, a back portion which is connected to the main body so as to be pivotable around an axis in a lateral direction and be movable within a predetermined range in a direction orthogonal to the axis, and which is pivotally connected to a rear end part of the seat portion on a lower end side thereof, and a restraint belt which is drawn out to a rear side of the back portion from a restraint position on an upper surface side of the seat portion through the back portion, and which is extended to a restraint position on a front end part of the seat portion via a lower surface side of the seat portion.

10 Claims, 10 Drawing Sheets

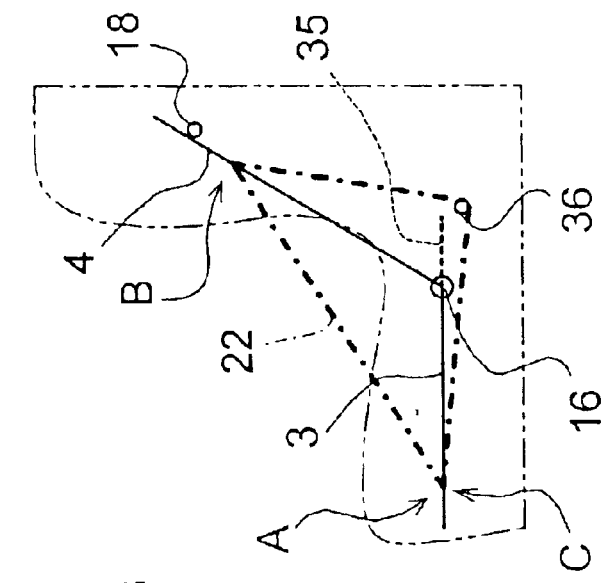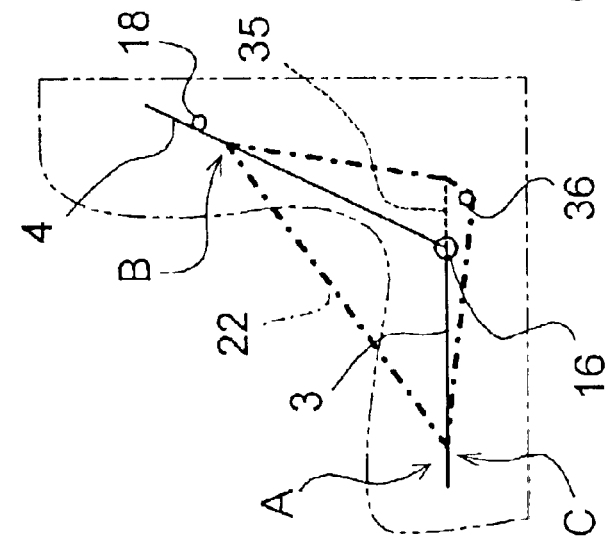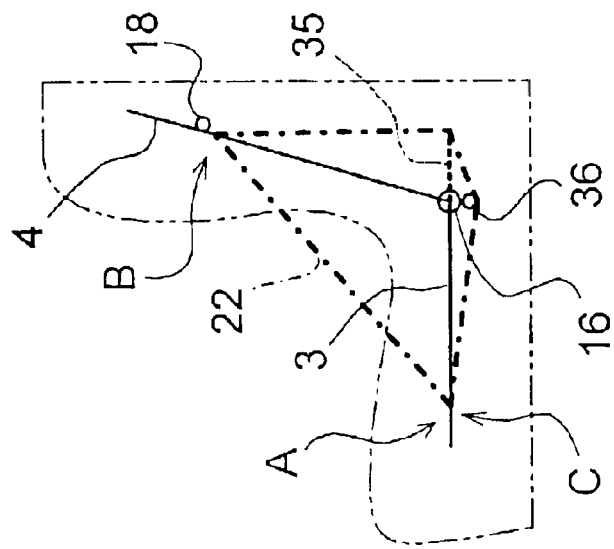

CHILD SEAT

BACKGROUND OF THE INVENTION

1. Field of the Invention

The present invention relates to a child seat in which a slope of a back portion is changed with a motion of a seat portion in a longitudinal direction.

2. Description of the Related Art

A child seat provided with a reclining mechanism for adjusting an angle of the back portion has been conventionally put to practical use. Various kinds of structures are proposed as the reclining mechanism. As one of them, there is proposed a reclining mechanism having a structure in which the rear end part of a seat portion is pivotally connected to the lower end part of a back portion, and the seat portion is provided so as to be movable in the longitudinal direction together with the lower end part of the back portion to thereby change the slope of the back portion.

In the child seat in which the seat portion and the back portion are interlocked as mentioned above, a restraint belt is once drawn out from a restraint position on the upper surface side of the seat portion (that is, a restraint position on a sitter side) to the rear side of the back portion with passing through the back portion, and is arranged in such a manner that the belt is closely attached to both of the back surface of the back portion and the lower surface of the seat portion and is restrained at a restraint position on the front end of the seat portion. Accordingly, when changing the angle of the back portion, a distance between the restraint positions with respect to the restraint belt is changed, and there is a possibility that the belt comes short and tends to be tightened with laying the back portion down. Also, the seat portion goes up in accordance with a forward movement of the seat portion due to a slope of a seat surface of a vehicle on which the child seat is placed, and a restraint condition for a sitter is changed according to that movement. Accordingly, there is a possibility that an impact resistance becomes unstable.

SUMMARY OF THE INVENTION

Accordingly, an object of the present invention is to provide a child seat which can inhibit a restraint condition from being changed in the case of changing a seat portion and a back portion in an interlocking manner.

In order to solve the above problem, according to one aspect of the present invention, there is provided a child seat comprising: a main body; a seat portion which is supported by the main body so as to be movable in a longitudinal direction; a back portion which is connected to the main body so as to be pivotally around an axis in a lateral direction and be movable within a predetermined range in a direction orthogonal to the axis, and which is pivotally connected to a rear end part of the seat portion on a lower end side thereof; a restraint belt which is drawn out to a rear side of the back portion from a restraint position on an upper surface side of the seat portion through the back portion, and which is extended to a restraint position on a front end part of the seat portion via a lower surface side of the seat portion; and a belt position regulating device for moving the restraint belt which is arranged around the rear end part of the seat portion backward from the back surface of the back portion.

According to the above aspect, since the restraint belt is backward apart from the pivotal center between the seat portion and the back portion, a required length of the restraint belt is reduced in the rear side of the back portion as the back portion is reclined. As a result, the short of the belt length at a time of reclining the back portion is compensated, and it is possible to inhibit the restraint condition of the belt from being changed as a whole, or it is possible to cancel the change of the restraint condition.

In the child seat according to the present invention, the main body may be provided with a belt holding device which is in contact with the restraint belt at a time when the seat portion moves forward to a predetermined position, and holds the restraint belt at a fixed position with respect to the main body regardless of a further forward movement of the seat portion. In this case, it is possible to limit the change in the belt length which is caused by the provision of the belt position regulating device to a proper range.

The belt position regulating device may be provided in the seat portion. In this case, there can be obtained an advantage that the position at which the belt position regulating device and the restraint belt are in contact with each other is not affected by the change in the slope of the back portion.

The seat portion may be supported to the main body via parallel link mechanism. In this case, even when the seat surface on which the main body is mounted is inclined obliquely, it is possible to longitudinally move the seat portion while keeping the height thereof constant. Accordingly, together with the effect of inhibiting the change of the belt length mentioned above, it is possible to securely inhibit the change of the restraint condition of the sitter and it is possible to stabilize the impact resistance without relation to the slope of the back portion.

The belt position regulating device may keep a position of the restraint belt in such a manner that a change of a length of the restraint belt required between the restraint position on the upper surface side of the seat portion and an insertion hole of the back portion through which the restraint belt passes is counterbalanced with a change of a length of the restraint belt between the insertion hole and a position at which the belt abuts the belt position regulating device regardless of a reclining motion of the back portion.

In the preferred embodiment of the present invention, the restraint belt is an assembly of a pair of shoulder belts and an adjust belt, one end of each shoulder belt is fixed to the seat portion while another end of each shoulder belt is connected to one end of the adjust belt on a rear side of the back portion, the adjust belt is arranged around the rear end part of the seat portion and is extended along a lower surface of the seat portion, and another end of the adjust belt is drawn out forward from the front end part of the seat portion via an adjuster which inhibits a backward returning motion of the adjust belt to thereby restrain the adjust belt. The belt position regulating device may be brought into contact with the adjust belt. The main body may be capable of being fixed to a seat of a vehicle by utilizing a harness of the vehicle.

According to another aspect of the present invention, there is provided a child seat comprising: a main body; a seat portion which is supported by the main body so as to be movable in a longitudinal direction; a back portion which is connected to the main body so as to be pivotable around an axis in a lateral direction and be movable within a predetermined range in a direction orthogonal to the axis, and which is pivotally connected to a rear end part of the seat portion on a lower end side thereof; a restraint belt which is drawn out to a rear side of the back portion from a restraint position on an upper surface side of the seat portion through the back portion, and which is extended to a restraint position on a front end part of the seat portion via a lower surface side of the seat portion; and a belt position regulating device which defines a path of the restraint belt so that the restraint belt drawn out to the rear side gradually goes backward from a virtual line obtained by connecting a connection position between the seat portion and the back portion and a restraint belt passing position of the back portion, as the restraint belt moves close to the lower end side of the back portion.

According to the above aspect, the restraint belt moves backward apart from the connection position between the seat portion and the back portion in the rear end part of the seat portion. Accordingly, in the same manner as the child seat mentioned above, the short in the length of the belt at a time of reclining the back portion is compensated, and the change in the restraint condition of the belt is inhibited as a whole or cancelled.

According to still another aspect of the present invention, there is provided a child seat comprising: a main body; a seat portion which is supported by the main body so as to be movable in a longitudinal direction; a back portion which is connected to the main body so as to be pivotable around an axis in a lateral direction and be movable within a predetermined range in a direction orthogonal to the axis, and which is pivotally connected to a rear end part of the seat portion on a lower end side thereof; and a restraint belt which is drawn out to a rear side of the back portion from a restraint position on an upper surface side of the seat portion through the back portion, and which is extended to a restraint position on a front end part of the seat portion via a lower surface side of the seat portion, and the seat portion is supported to the main body via a parallel link mechanism.

According to the above aspect, even when the seat surface on which the main body is mounted is inclined obliquely, it is possible to inhibit the restraint condition of the sitter from being changed by moving the seat portion longitudinally while keeping the height of the seat portion constant.

BRIEF DESCRIPTION OF THE DRAWINGS

FIGS. 7A to 7C are views which show an example of a relation between a displacement of the back portion and a belt path in the present invention;

DESCRIPTION OF THE PREFERRED EMBODIMENTS

Figure 1:
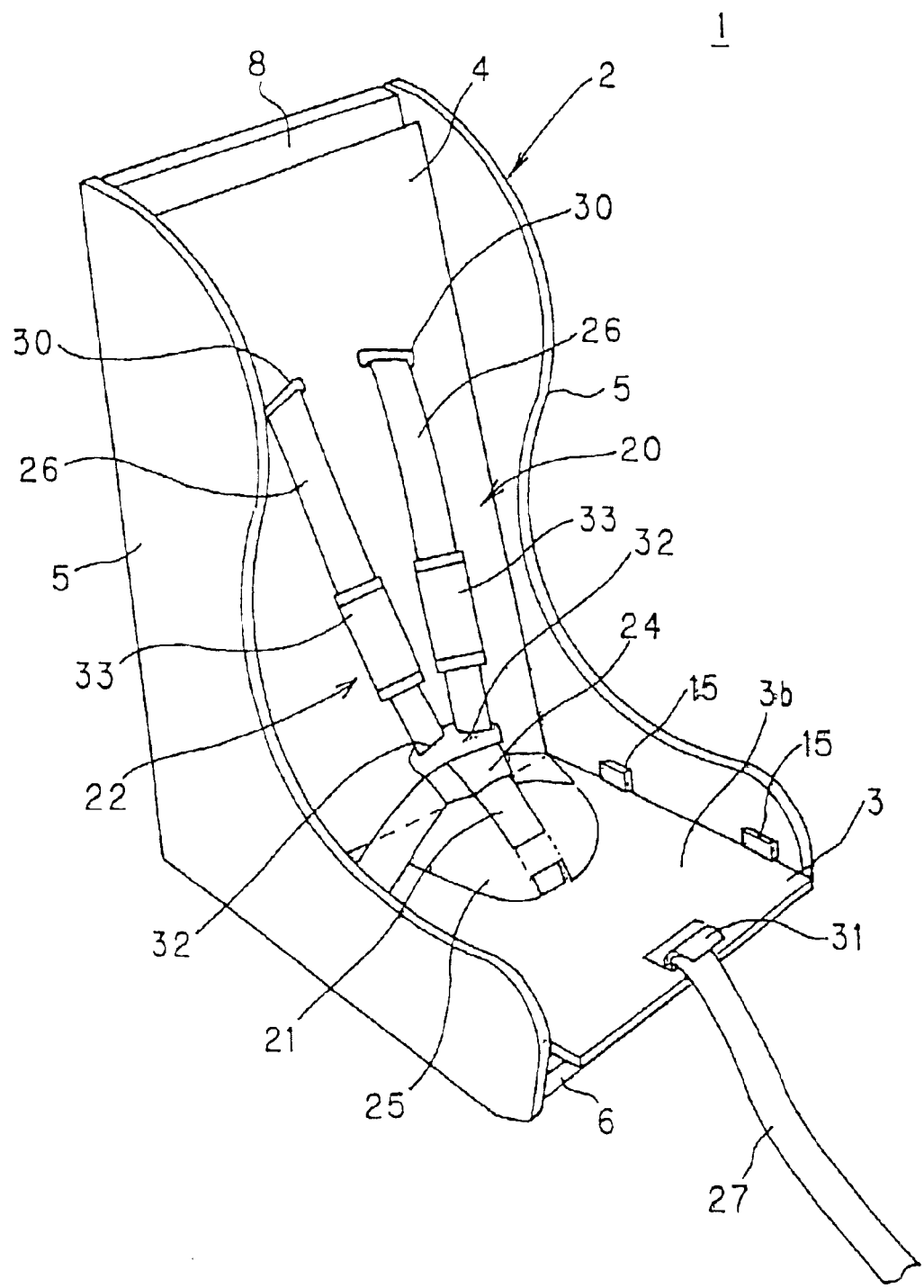
FIG. 1 is a perspective view of a child seat according to an embodiment of the present invention as seen from a front surface side.
Figure 2:
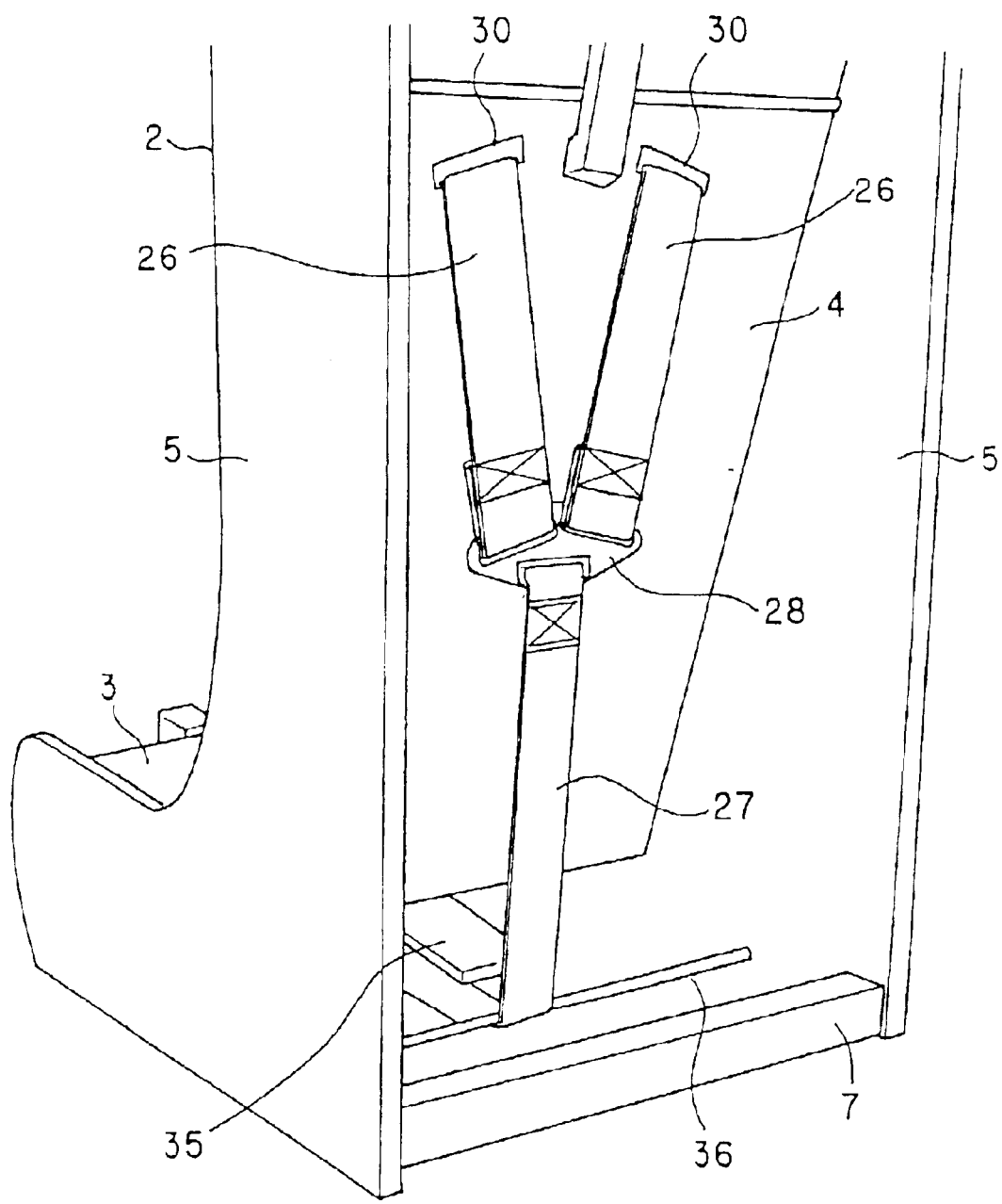
FIG. 2 is a perspective view of the child seat according to the embodiment of the present invention as seen from a back surface side.
Figure 3:
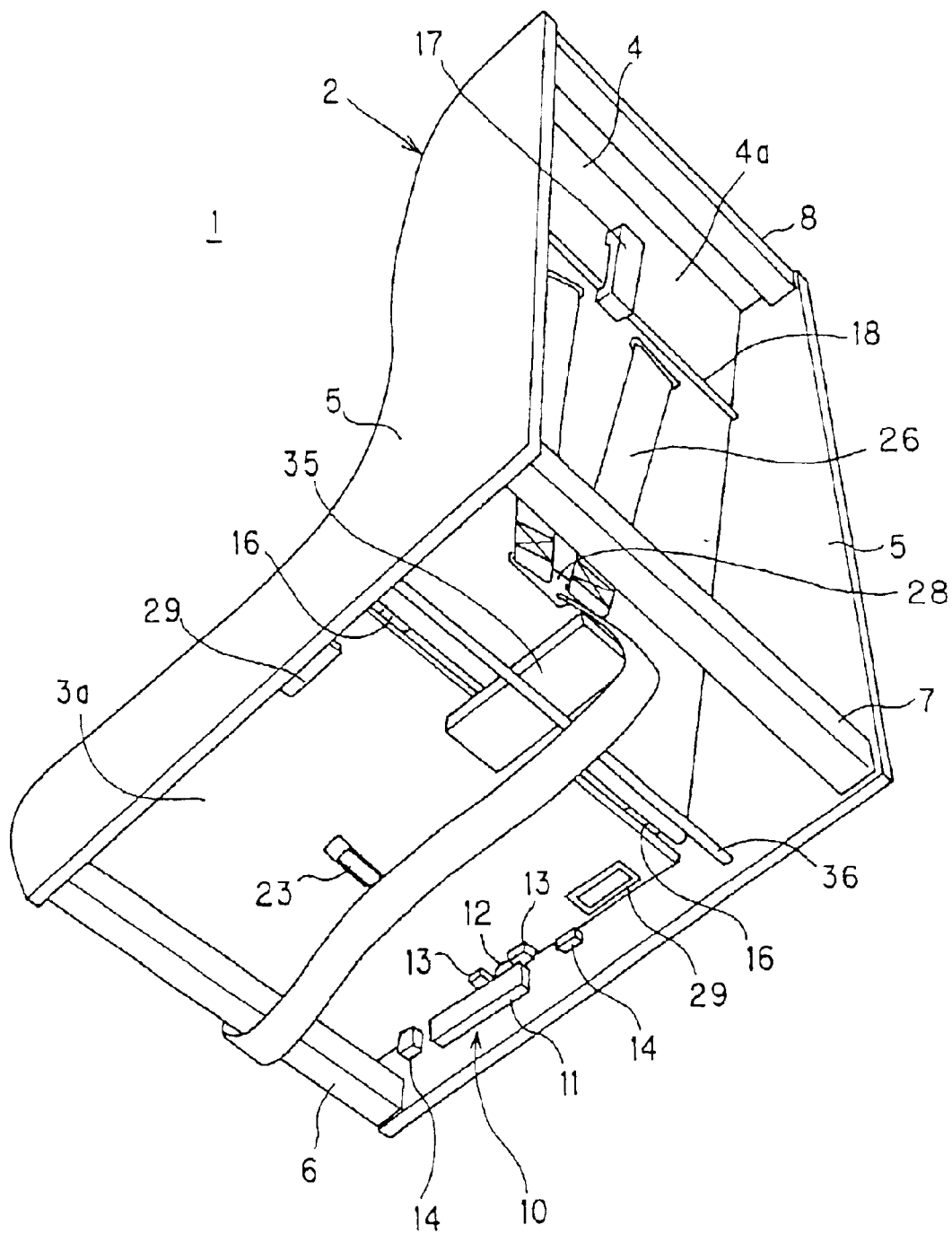
FIG. 3 is a perspective view of the child seat according to the embodiment of the present invention as seen from a bottom surface side.
Figure 4:
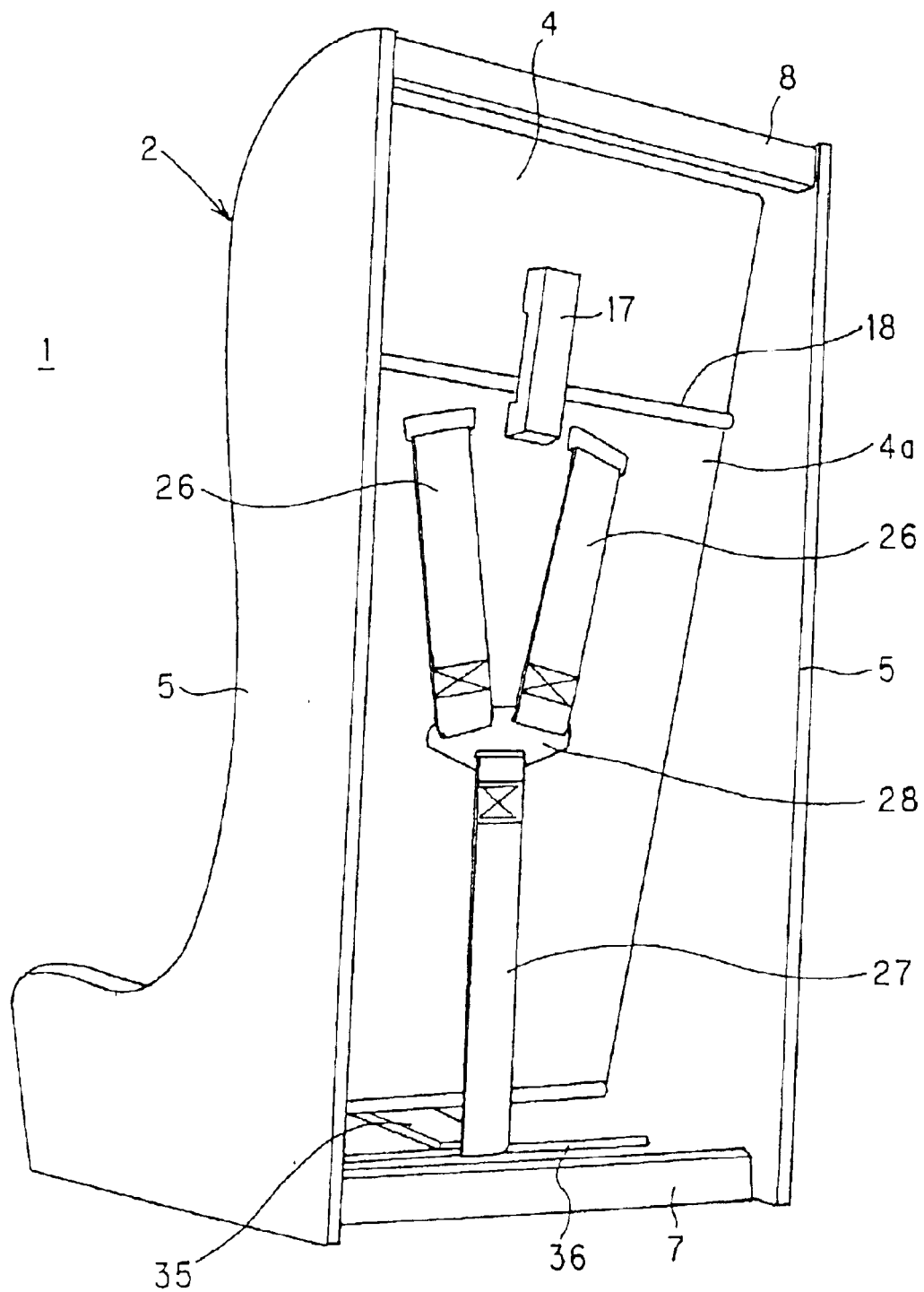
FIG. 4 is a view showing a state in which a seat portion is moved forward from a state in FIG. 2.

FIGS. 1 to 3 show a child seat, or a so-called child car seat according to an embodiment of the present invention, in which FIG. 1 is a perspective view from a front surface side, FIG. 2 is a perspective view from a back surface side, and FIG. 3 is a perspective view from a bottom surface side. Also, FIG. 4 shows a state in which a back portion is reclined from a state in FIG. 2. As is apparent from these figures, a child seat 1 is provided with a main body 2, a seat portion 3 and a back portion 4, each of which is supported on the main body 2, and a harness 20. The main body 2 is provided with a pair of side walls 5, and horizontal beams 6, 7 and 8 which connect the side walls 5. The main body 2 is generally a resin molded product, however, may be constructed by the other materials. The main body 2 is fixed on a seat of a vehicle by utilizing a harness, or a seat belt thereof. Grooves, through holes and the like for passing the harness of the vehicle therethrough are formed in the main body 2, however, an illustration thereof is omitted.

Figure 5A:
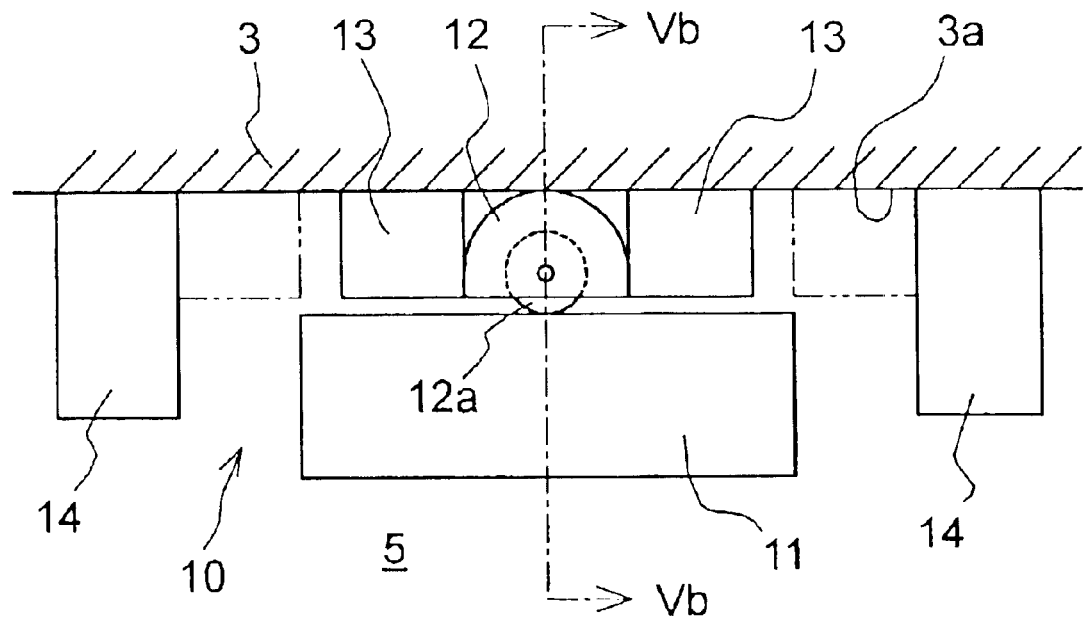
FIGS. 5A and 5B are views which show a guide mechanism for the seat portion.
Figure 5B:
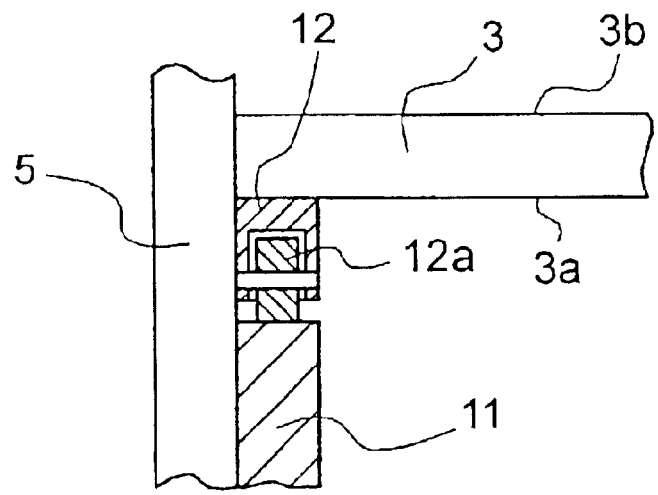

As shown in FIG. 3, the seat portion 3 is mounted to the main body 2 through a predetermined guide mechanism 10 so as to be movable in a longitudinal direction. FIG. 5A is a view which shows a state of the guide mechanism 10 as seen from an inner side of the side wall 5, and FIG. 5B is a cross sectional view along a line Vb—Vb in FIG. 5A. In the guide mechanism 10 shown in these figures, rails 11 are provided on both inner surface sides of the sidewalls 5. In this case, only one rail 11 provided on one inner surface side is shown in FIG. 3, and the other rail 11 provided on the other inner surface side is hidden behind the side wall 5. Also, at a position on a lower surface 3a of the seat portion 3, which is opposite to the rail 11, there are provided a guide device 12 comprising a roller 12a for making movement smooth and holding members 13 for holding the guide device 12 in a longitudinal direction. The roller 12a can roll on the rail 11, and the seat portion 3 is guided in the longitudinal direction owing to the rolling motion of the roller 12a. On the inner surface of the side wall 5, there are mounted stoppers 14 which are brought into contact with the holding members 13 to thereby define a moving range of the seat portion 3. As shown in FIG. 1, protruding portions 15 . . . 15 are suitably provided on the inner side of the side wall 5. The protruding portion 15 . . . 15 are brought into contact with an upper surface 3b of the seat portion 3 to thereby prevent the seat portion 3 from floating up. In this case, a moving direction of the seat portion 3 may be made parallel to the lower end of the main body 2, or may be obliquely inclined with respect to the lower end of the main body 2. Also, the roller 2a is not always required, but the structure may be made without the roller 12a.

Figure 6:
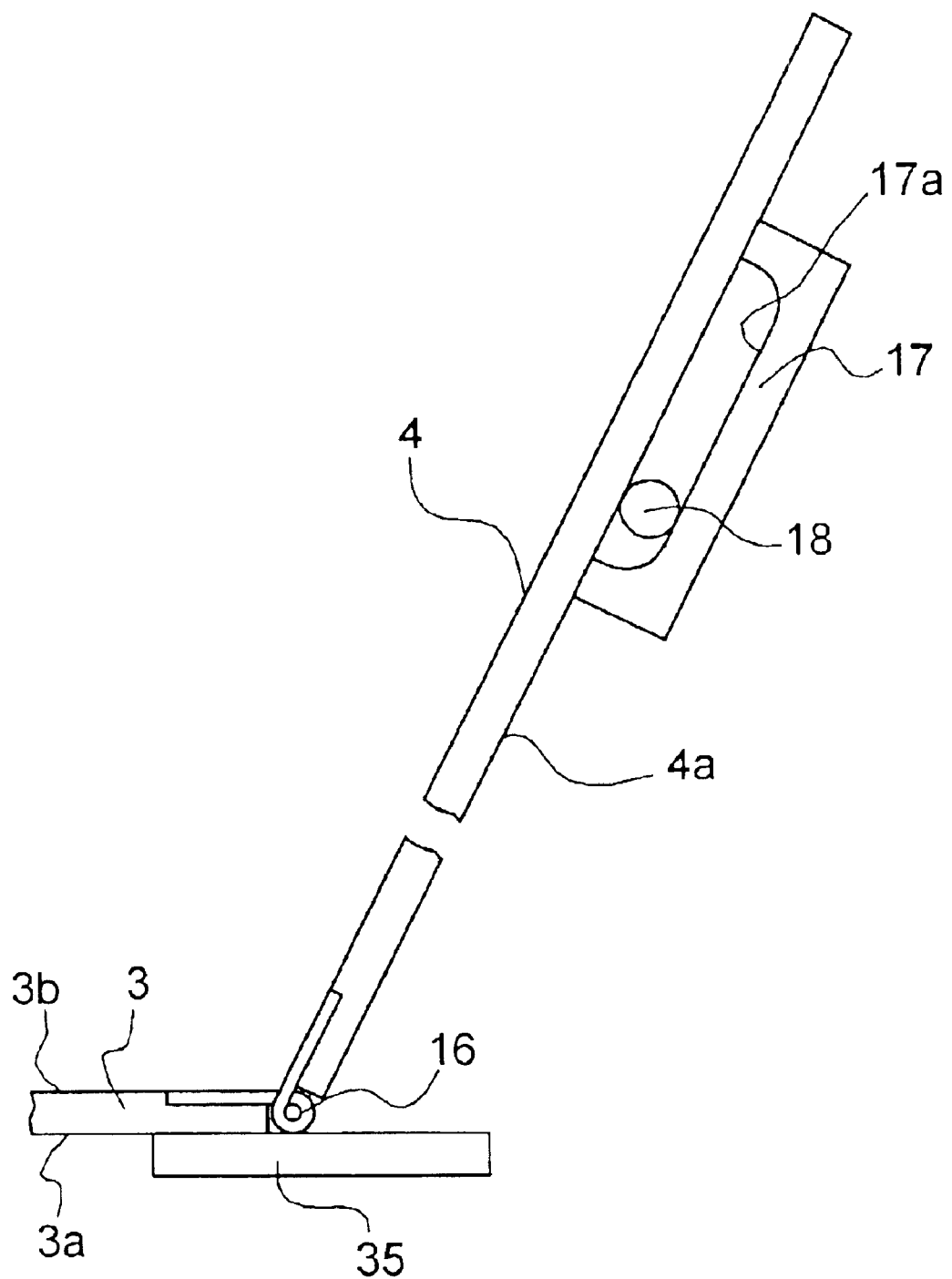
FIG. 6 is a view which shows a connection portion between a back portion and a main body.

As shown in FIGS. 3 and 6, the back portion 4 is pivotally connected to the rear end of the seat portion 3 via hinges 16 at the lower end thereof. A connection portion 17 is provided on a back surface 4a of the back portion 4. In the connection portion 17, there is formed a slotted hole 17a extending substantially in a vertical direction, and a rod 18 is inserted through the slotted hole 17a. The rod 18 is fixed to the side walls 5 at both ends thereof. Accordingly, the back portion 4 is connected to the main body 2 so as to be pivotable around the rod 18 and movable within a predetermined range substantially in the vertical direction along the slotted hole 17a. In this case, a backward load to be applied to the back portion 4 can be supported by the main body 2 via the rod 18. The connection portion 17 may be integrally formed with the back portion 4. The connection portion 17 maybe manufactured in a process separate from that of the back portion 4 and may be fixed to the back portion 4 by utilizing fixing means such as bolts, an adhesive agent or the like.

Next, a description will be given in detail of the harness 20. As shown in FIG. 1, the harness 20 is constructed by combining a crotch belt 21 and a restraint belt 22. The crotch belt 21 is passed the crotch of a sitter, or a person who sits on the seat portion 3, and a lower end of the crotch belt 21 is fixed to a side of the lower surface 3a of the seat portion 3 via a fixing device 23 (refer to FIG. 3). On an upper end of the crotch belt 21, there is mounted a buckle 24 for connecting the restraint belt 22 therewith. In this case, a pad 25 which receives the sitter is mounted in the middle of the crotch belt 21.

On the other hand, the restraint belt 22 is an assembly which is structured by connecting a pair of shoulder belts 26 and one adjust belt 27 on a side of the back surface 4a of the back portion 4 through a connecting device 28. One end of each shoulder belt 26 is drawn out to a side of the lower surface 3a through the seat portion 3, and is prevented from coming off by a fixing device 29 (refer to FIG. 3). On the contrary, another end of each shoulder belt 26 is drawn out to a side of the back surface 4a via a belt insertion hole 30 of the back portion so as to be fixed to the connecting device 28. One end of the adjust belt 27 is fixed to the connecting device 28. The adjust belt 27 is arranged around the rear end of the seat portion 3 and is extended along the lower surface 3a. And the other end of the adjust belt 27 is drawn out forward from a front end of the seat portion 3 through an adjuster 31 mounted to a front end of the seat portion 3. The adjuster 31 is a well-known holding device which allows the belt 27 to be drawn out forward, and inhibits a backward returning motion of the belt 27 unless a predetermined canceling operation is performed. On the basis of a function of the adjuster 31, it is possible to adjust a length of the restraint belt 22 between a restraint position of the shoulder belt 26 with respect to the seat portion 3 (a position at which a come-off is prevented by the fixing device 29) and a restraint position on a side of the adjuster 31, to a proper length in correspondence to the build of a sitter.

A tongue fitting 32 is mounted to each of the shoulder belts 26. The tongue fitting 32 can move along the belt 26. The restraint belt 22 and the crotch belt 21 are connected to each other by inserting the respective tongue fittings 32 to the buckle 24 so as to engage with each other. In this case, a tubular cover 33 is mounted to each of the shoulder belts 26. Also, a lock mechanism which holds the seat portion 3 and the back portion 4 at a fixed position is provided in the child seat 1, however, an illustration thereof is omitted.

In the child seat 1 mentioned above, when moving the seat portion 3 forward, the lower end of the back portion 4 is pulled forward in correspondence to the movement of the seat portion 3, and the back portion 4 is reclined while being rotated around the rod 18 in a state in which the back surface 4a is supported on the rod 18. In this case, the belt length required between the restraint position of the shoulder belt 26 by the fixing device 29 and the belt insertion hole 30 becomes greater as the back portion 4 is reclined. On the contrary, if the restraint belt 22 drawn out to the side of the back surface 4a of the back portion 4 is arranged so as to be substantially closely attached to both the back surface 4a of the back portion 4 and the lower surface 3a of the seat portion 3, the belt length required between the position of the belt insertion hole 30 and the restraint position of the belt 22 by the adjuster 31 is kept constant regardless of an angle of the back portion 4. In this case, the belt length relatively comes short as the back portion 4 is reclined. That is, the restraint condition of the sitter is changed in correspondence to the slope of the back portion 4. Accordingly, there is generated a necessity of loosening the adjuster 31 so as to readjust the belt length between the restraint portions every time when the angle of the back portion 4 is changed.

As shown in FIGS. 2 to 4, in order to reduce an amount of adjustment in the belt length or make the adjustment unnecessary, according to the present embodiment, a belt position regulating plate 35, which protrudes backward from the back surface 4a of the back portion 4, is provided as a belt position regulating device on the rear end of the lower surface 3a of the seat portion 3, and the restraint belt 22 (the adjust belt 27) is pushed backward from the back surface 4a of the back portion 4 by the belt position regulating plate 35. Also, a rod 36 is mounted, as a belt holding device, between the side walls 5. A position of the rod 36 is deviated forward from a position of a leading end (a position with which the belt 27 is brought into contact) of the belt position regulating plate 35 at a time of vertically rising the back portion 4 most, that is, at a time of moving the seat portion 3 most backward.

A description will be given of an operation of the belt position regulating plate 35 and the rod 36 with reference to FIGS. 7A to 7C. In this case, in FIGS. 7A to 7C, a path of the restraint belt 22 is shown by a one-dot chain line, and a restraint position of the restraint belt 22 in the seat portion 3, a position of the belt insertion hole 30 and a restraint position by the adjuster 31 are denoted by reference symbols A, B and C, respectively. In this case, the belt path from the restraint position A to the belt passing position B does not actually become a straight line, however, the belt path is shown by a straight line as a matter of convenience.

First of all, in a state shown in FIG. 7A in which the back portion 4 is risen, the restraint belt 22 which is drawn out to the side of the back surface 4a of the back portion 4 is pushed backward of the back portion 4 by the belt position regulating plate 35, at the lower end of the back portion 4. In the case of moving the back portion 3 forward as shown in FIG. 7B from the above state so as to recline the back portion 4, a distance from the restraint position A to the center of rotation in the hinge 16 remain unchanged, however, the belt insertion hole 30 relatively moves backward with respect to the center of rotation in the hinge 16. Accordingly, the length of the restraint belt 22 required between the restraint position A and the belt insertion hole 30 is increased. On the other hand, the belt length required between the insertion hole 30 and the contact position between the belt position regulating plate 35 and the restraint belt 22 is reduced as the back portion 4 is reclined. These changes with respect to the belt length are counterbalanced with each other, whereby the short in length of the belt 22 between the restraint portions is reduced or cancelled. As shown in FIG. 7C, in the case of further reclining the back portion 4, the restraint belt 22 is held by the rod 36 and is away from the belt position regulating plate 35 (refer to FIG. 4). Accordingly, it is possible to limit the effect applied by the belt position regulating plate 35 within a proper range.

Figure 8:
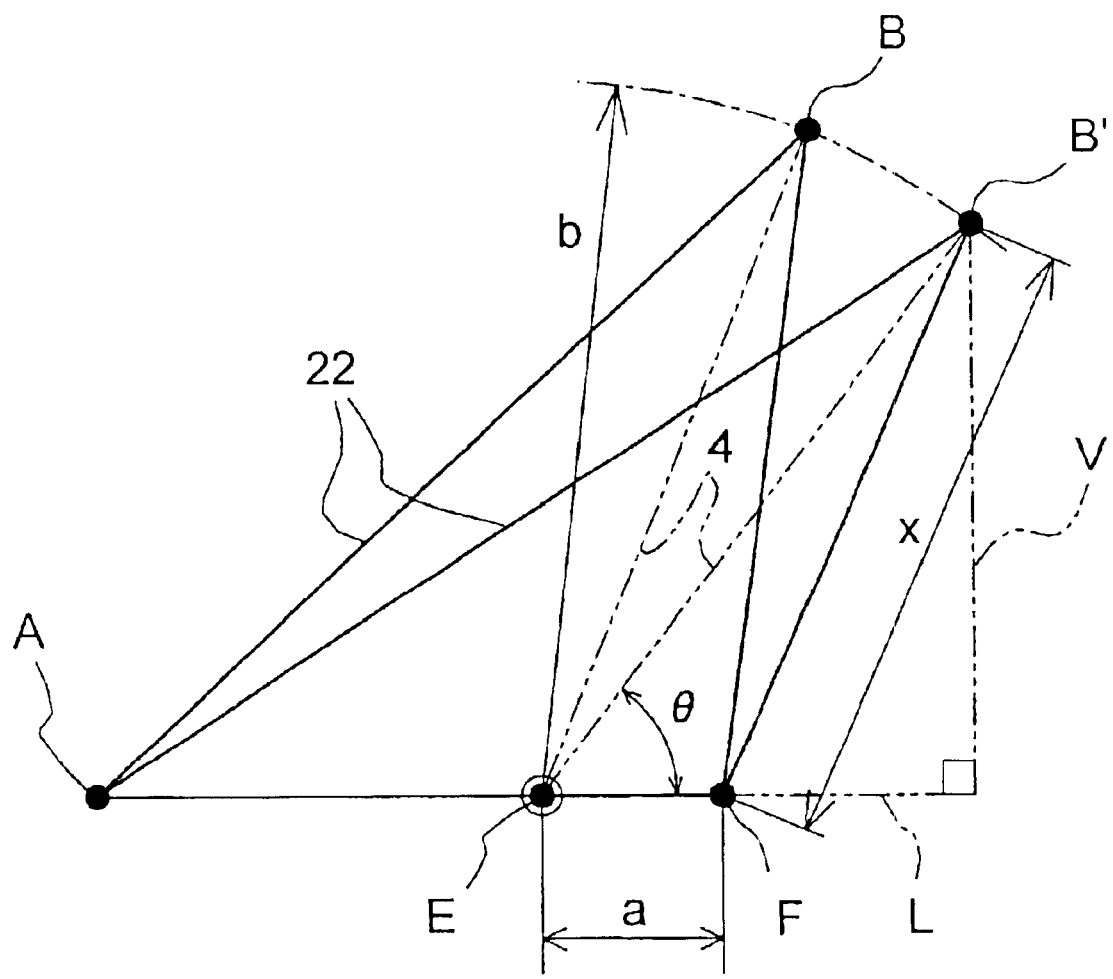
FIG. 8 is a view for describing a change of the belt path in the back surface side of the back portion.

The relation mentioned above will be described in more detail with reference to FIG. 8. In FIG. 8, a point A shows a restraint position of the restraint belt 22 with respect to the seat portion 3 by the fixing device 29, points B and B' show positions at which the restraint belt 22 passes through the belt insertion hole 30 of the back portion 4, a point E shows a center of rotation of the hinge 16 which connects the seat portion 3 and the back portion 4 to each other, and a point F shows a restraint position of the belt 22 by the belt position regulating plate 35, respectively. In this case, in FIG. 8, a slope of the back portion 4 at a time of rising is represented by a line segment BE, and a slope of the back portion 4 at a time of reclining is represented by a line segment B'E.

In FIG. 8, the belt lengths from the restraint position A to the belt passing positions B and B' can be represented by line segments AB and AB', respectively. A distance from the center of rotation of the hinge 16 to the belt insertion hole 30 is constant regardless of the slope of the back portion 4, and lengths of the line segments EB and EB' are equal to each other. Accordingly, a length of the line segment AB' is greater than that of the line segment AB. This means that the required length of the belt 22 is increased in the front surface side of the back portion 4 as the back portion 4 is reclined. On the other hand, when defining a distance from the belt passing positions B and B' by the belt insertion hole 30 to the restraint position F of the belt 22 by the belt position regulating plate 35 to x, defining a distance from the center E of rotation to the restraint position F to a, defining a distance from the belt passing positions B and B' to the center E of rotation to b, and defining an angle formed between the line obtained by connecting the center E of rotation to the belt passing positions B and B', and a straight line L to θ, the distance x can be given by the following formula (1).

$$x = \sqrt{(a^2 + b^2 - 2ab\cos\theta)} \quad (1)$$

Therefore, a distance x becomes smaller as the angle θ becomes smaller, that is, the back portion 4 is reclined. As a result, the belt length between the belt insertion hole 30 and the belt position regulating plate 35 is reduced as the back portion 4 is reclined. On the other hand, as mentioned above, the belt length from the restraint position A to the belt passing position B is increased as the back portion 4 is reclined. While the required length of the belt is increased in the front surface side of the back portion 4 in the manner mentioned above, the required length of the belt is reduced in the side of the back surface 4a. Therefore, these changes are counterbalanced with each other, and the change in the required belt length is reduced or cancelled as a whole. As a result, the change in the restraint condition at a time of changing the slope of the back portion 4 is restricted or cancelled.

Figure 9A:
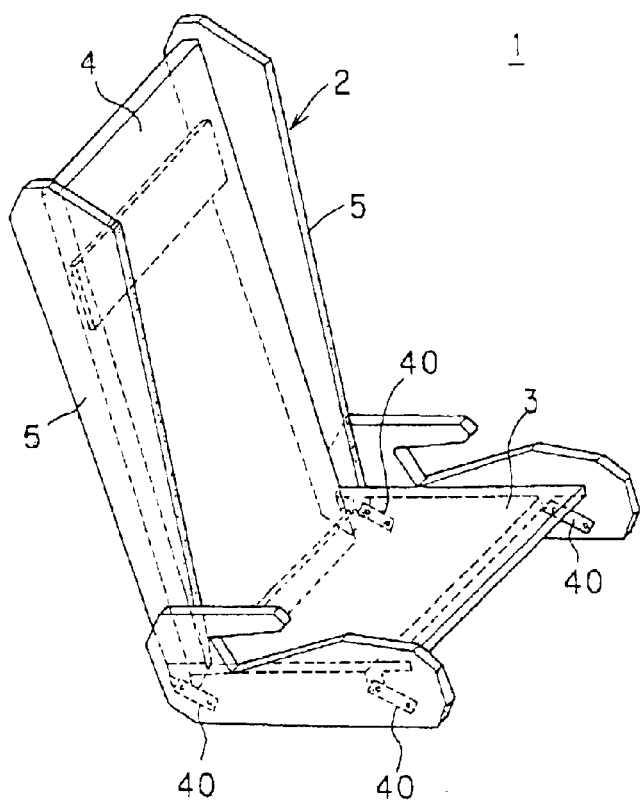
FIGS. 9A and 9B are views showing another embodiment in which a support mechanism for the seat portion is changed.
Figure 9B:
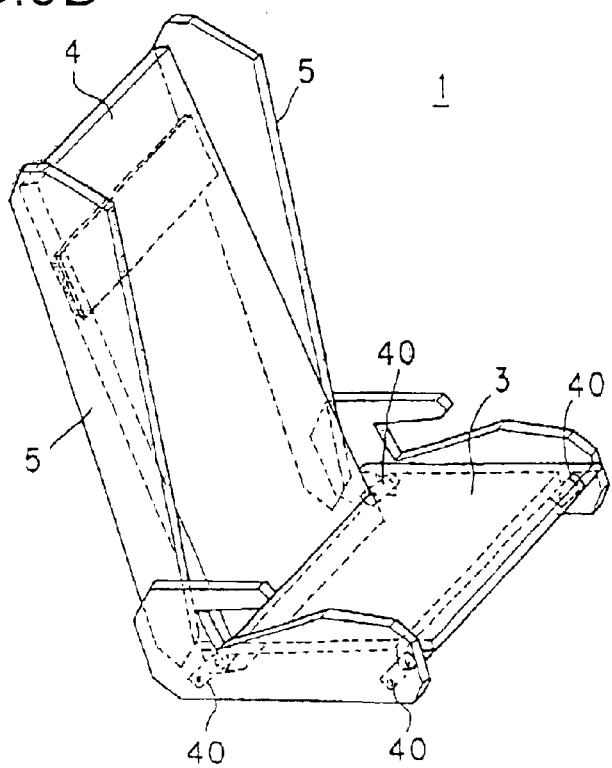
Figure 10:
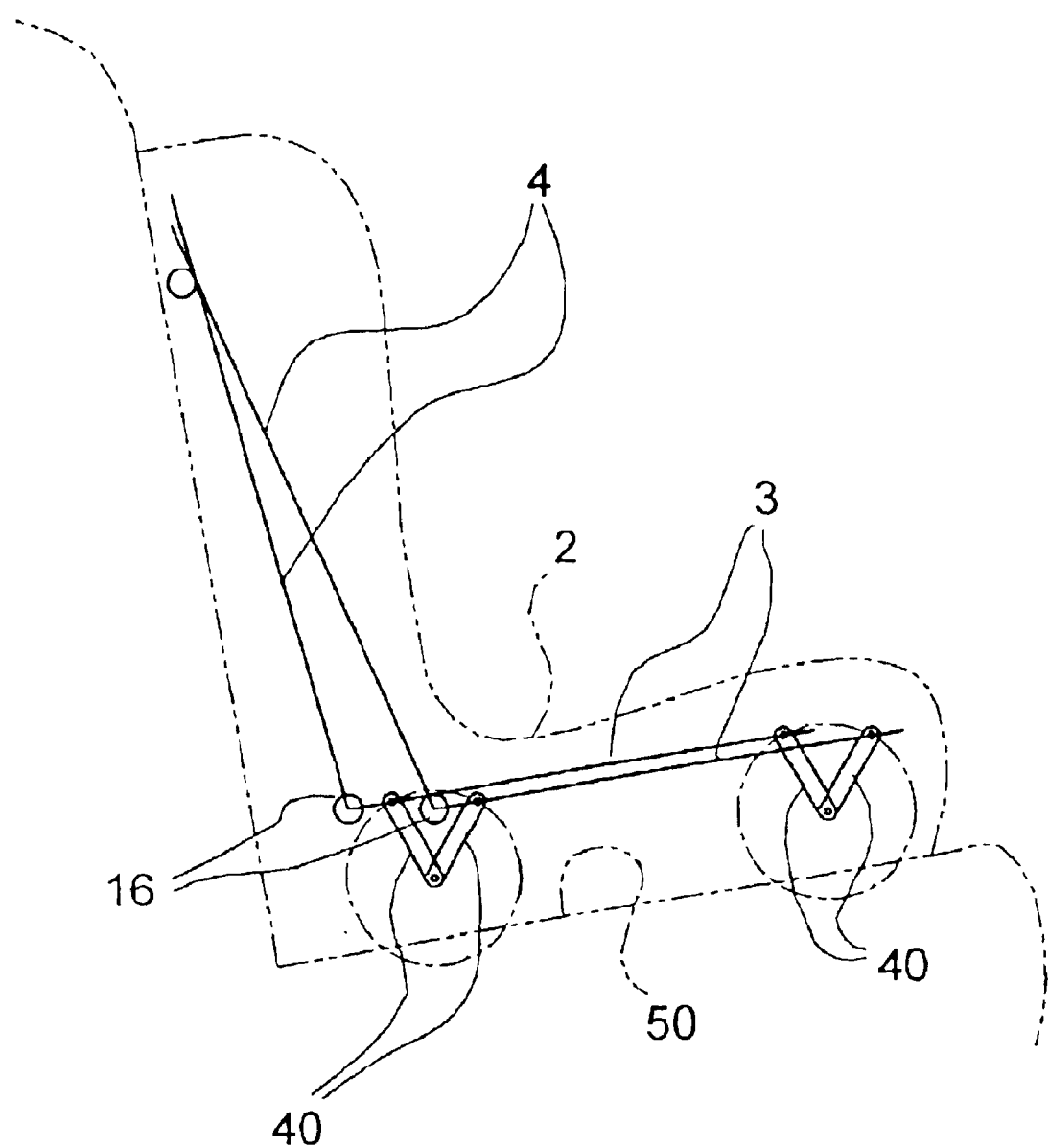
FIG. 10 is a view showing a state in which the seat portion is moved longitudinally while being kept constant in a height by the support mechanism.

The present invention is not limited to the embodiment mentioned above, and may be carried out according to various aspects. FIGS. 9A and 9B show an embodiment in which the guide mechanism 10 of the seat portion 3 is modified. In this embodiment, each of the side walls 5 of the main body and the seat portion 3 are connected via a pair of front and rear parallel links 40, which form a parallel link mechanism. In the case of connecting the seat portion 3 to the main body 2 with using the parallel links 40, it is possible to move the seat portion 3 longitudinally while keeping the height of the seat portion 3 (in this case, an absolute height from a ground plane of the vehicle) constant, for example, even when a seat surface 50 of the vehicle is inclined obliquely as shown in FIG. 10. Accordingly, it is possible to keep a position of a gravity center of the sitter with respect to the vertical direction constant regardless of the change in the slope of the back portion 4, and it is possible to inhibit the restraint condition in correspondence to the displacement of the seat portion 3 or the back portion 4 from being changed. In this connection, in the case of moving the seat portion 3 in parallel to the lower end surface of the side wall 5, the position of the gravity center of the sitter becomes higher as the seat portion 3 is moved forward according to the slope of the seat surface 50, and the impact resistance is changed.

In the embodiment mentioned above, one end of the restraint belt 22 is fixed to the side of the lower surface of the seat portion 3, and the tongue fitting 32 which is movably provided on the restraint belt 22 is connected to the buckle 24. However, the present invention is not limited to the aspects mentioned above. For example, the present invention can be applied to the child seat structured such that a tongue fitting is mounted to the front end of the restraint belt 22, and the tongue fitting is connected to the buckle fixed to the seat portion 3. In the present invention, the belt position regulating plate 35 is provided in the lower surface 3a of the seat portion 3, however, the belt position regulating device may be provided in the back portion 4. As is apparent from the formula (1) mentioned above, the effect according to the present invention can be achieved as far as the restraint belt 22 is guided in such a manner that the restraint belt 20 is backward away from a virtual line (corresponding to the line segments BE and B'E in FIG. 8) obtained by connecting the belt insertion hole 30 and the rotation center of the hinge 16 to each other as the restraint belt 22 drawn out from the belt insertion hole 30 to the side of the back surface 4a goes downward. Therefore, at least the opposing portion to the belt 22 in the back surface 4a of the back portion 4 may be protruded backward as the opposing portion goes to the lower part thereof, thereby closely attaching the protruding portion to the belt 22. The illustrated shapes of the seat portion 3 and the back portion 4 correspond to one example, and can be suitably modified. In the embodiment mentioned above, it is desirable that the loosened belt 22 can be securely held by the belt position regulating plate 35 by using means of depressing the leading end of the belt position regulating plate 35 in conformity with a width of the belt 22.

As described above, according to the present invention, it is possible to counterbalanced the changes of the required belt lengths in the front surface side and in the back surface side of the back portion with each other at a time of changing the slope of the back portion, by making the restraint belt extending around the rear end of the seat portion be backward away from the connection position between the seat portion and the back portion. Further, it is possible to move the seat portion longitudinally while keeping the height of the seat surface substantially constant by supporting the seat portion to the main body via the parallel links. Accordingly, it is possible to inhibit the change in the restraint condition of the sitter at a time of displacing the seat portion and the back portion in an interlocking manner.

What is claimed is:

1. A child seat comprising:
   a main body;
   a seat portion which is supported by the main body so as to be movable in a longitudinal direction;
   a back portion which is connected to the main body so as to be pivotable around a laterally extending axis and be movable within a predetermined range in a direction orthogonal to the axis, and which is pivotally connected to a rear end part of the seat portion on a lower end side thereof;
   a restraint belt which is drawn out to a rear side of the back portion from a restraint position on an upper surface side of the seat portion through the back portion, and which is extended to a restraint position on a front end part of the seat portion via a lower surface side of the seat portion; and
   a belt position regulating device for moving the restraint belt which is arranged around the rear end part of the seat portion backward from the back surface of the back portion.

2. The child seat according to claim 1, wherein the main body is provided with a belt holding device capable of being in contact with the restraint belt at a time when the seat portion moves forward to a predetermined position, and holds the restraint belt at a fixed position with respect to the main body regardless of a further forward movement of the seat portion.

3. The child seat according to claim 1, wherein the belt position regulating device is provided on the seat portion.

4. The child seat according to claim 1, wherein the seat portion is supported to the main body via a parallel link mechanism.

5. The child seat according to claim 1, wherein the belt position regulating device keeps a position of the restraint belt in such a manner that a change of a length of the restraint belt required between the restraint position on the upper surface side of the seat portion and an insertion hole of the back portion through which the restraint belt passes is counterbalanced with a change of a length of the restraint belt between the insertion hole and a position at which the belt abuts the belt position regulating device regardless of a reclining motion of the back portion.

6. The child seat according to claim 1, wherein the restraint belt is an assembly of a pair of shoulder belts and an adjust belt, one end of each shoulder belt is fixed to the seat portion while another end of each shoulder belt is connected to one end of the adjust belt on a rear side of the back portion, the adjust belt is arranged around the rear end part of the seat portion and is extended along said lower surface side of the seat portion, and another end of the adjust belt is drawn out forward from the front end part of the seat portion via an adjuster which inhibits a backward returning motion of the adjust belt to thereby restrain the adjust belt.

7. The child seat according to claim 6, wherein the belt position regulating device is brought into contact with the adjust belt.

8. The child seat according to claim 1, wherein the main body is capable of being fixed to a seat of a vehicle by utilizing a harness of the vehicle.

9. A child seat comprising:

a main body;

a seat portion which is supported by the main body so as to be movable in a longitudinal direction;

a back portion which is connected to the main body so as to be pivotable around a laterally extending axis and be movable within a predetermined range in a direction orthogonal to the axis, and which is pivotally connected to a rear end part of the seat portion on a lower end side thereof;

a restraint belt which is drawn out to a rear side of the back portion from a restraint position on an upper surface side of the seat portion through the back portion, and which is extended to a restraint position on a front end part of the seat portion via a lower surface side of the seat portion; and a belt position regulating device which defines a path of the restraint belt so that the restraint belt drawn out to the rear side gradually goes backward from a virtual line obtained by connecting a connection position between the seat portion and the back portion and a restraint belt passing position of the back portion, as the restraint belt moves close to the lower end side of the back portion.

10. A child seat comprising:

a main body;

a seat portion which is supported by the main body so as to be movable in a longitudinal direction;

a back portion which is connected to the main body so as to be pivotable around a laterally extending axis and be movable within a predetermined range in a direction orthogonal to the axis, and which is pivotally connected to a rear end part of the seat portion on a lower end side thereof; and a restraint belt which is drawn out to a rear side of the back portion from a restraint position on an upper surface side of the seat portion through the back portion, and which is extended to a restraint position on a front end part of the seat portion via a lower surface side of the seat portion, wherein the seat portion is supported to the main body via a parallel link mechanism.

* * * * *